(12) United States Patent
Cruickshanks

(10) Patent No.: US 9,599,447 B2
(45) Date of Patent: Mar. 21, 2017

(54) LARGE T-SQUARE PROTRACTOR FOR USE IN CONSTRUCTION

(76) Inventor: Greg Wayne Cruickshanks, Nova Scotia (CA)

( * ) Notice: Subject to any disclaimer, the term of this patent is extended or adjusted under 35 U.S.C. 154(b) by 62 days.

(21) Appl. No.: 14/376,731

(22) PCT Filed: Feb. 6, 2012

(86) PCT No.: PCT/CA2012/000091
§ 371 (c)(1),
(2), (4) Date: Oct. 10, 2014

(87) PCT Pub. No.: WO2013/116915
PCT Pub. Date: Aug. 15, 2013

(65) Prior Publication Data
US 2015/0168122 A1    Jun. 18, 2015

(51) Int. Cl.
| | | |
|---|---|---|
| *B43L 7/10* | (2006.01) |
| *G01B 5/24* | (2006.01) |
| *E04D 15/00* | (2006.01) |
| *G01B 3/56* | (2006.01) |
| *B25H 7/04* | (2006.01) |
| *B43L 7/12* | (2006.01) |

(52) U.S. Cl.
CPC ............... *G01B 5/24* (2013.01); *B25H 7/04* (2013.01); *B43L 7/12* (2013.01); *E04D 15/00* (2013.01); *G01B 3/563* (2013.01)

(58) Field of Classification Search
CPC .. G01B 3/563; G01B 5/24; B43L 7/12; B43L 7/10

USPC .................................................. 33/465, 471
See application file for complete search history.

(56) References Cited

U.S. PATENT DOCUMENTS

| | | | | |
|---|---|---|---|---|
| 532,001 | A | * | 1/1895 | Linden .................. G01B 3/563 33/471 |
| 936,157 | A | | 10/1909 | Phenix |
| 1,010,664 | A | | 12/1911 | Melick |
| 1,083,376 | A | | 1/1914 | Robinson |
| 1,429,999 | A | * | 9/1922 | Barlow .................... G01B 3/28 33/464 |
| 1,576,800 | A | * | 3/1926 | Tibony ..................... B43L 7/12 33/27.03 |
| 2,247,327 | A | | 6/1941 | Brady |
| 2,420,090 | A | * | 5/1947 | Nelson ..................... B43L 7/12 33/447 |
| 3,416,232 | A | * | 12/1968 | Overbay .................. B43L 7/12 33/424 |
| 4,208,804 | A | * | 6/1980 | Lundin ................... B43L 7/005 33/418 |

(Continued)

*Primary Examiner* — G. Bradley Bennett

(57) ABSTRACT

A framing T-square protractor apparatus includes a first rule element having first and second edges, a surface, and a length of about 3 ft between the first and second edges; a second rule element having first and second edges, a surface, and a length of about 5 ft between the first and second edges, the second rule element being pivotally connected to the first rule element midway between the first and second edges of the first rule element; and a semi-circular element extending between the first and second edges of the first rule element to form an 180 degrees arc with 0 to 90 degrees angle indicia on each half, the semi-circular element being connected to the first and second edges of the first rule element and being adapted to movably receive the second rule element for sliding along the semi-circular element.

12 Claims, 2 Drawing Sheets

(56) References Cited

U.S. PATENT DOCUMENTS

| | | | |
|---|---|---|---|
| 4,611,407 A | 9/1986 | van Gorp | |
| 4,736,524 A | 4/1988 | King | |
| 6,256,900 B1 * | 7/2001 | Myers | B23Q 3/007 33/471 |
| 6,725,555 B1 * | 4/2004 | Moore | B25H 7/00 33/423 |
| 6,954,990 B2 | 10/2005 | Ellis | |
| 7,188,427 B2 | 3/2007 | Johnson | |
| 7,278,217 B1 | 10/2007 | Mills | |
| 7,478,485 B1 * | 1/2009 | Rogell | B43L 7/0275 33/421 |
| 2012/0159797 A1 * | 6/2012 | Roth | B43L 7/0275 33/424 |
| 2012/0311880 A1 * | 12/2012 | Doggett | B43L 7/14 33/452 |

\* cited by examiner

LARGE T-SQUARE PROTRACTOR FOR USE IN CONSTRUCTION

This is a national stage of PCT/CA12/000091 filed Feb. 6, 2012 and published in English, hereby incorporated by reference.

FIELD OF THE INVENTION

The invention relates to T-squares for use in construction and, in particular, to framing T-squares including a protractor for angle measuring of large materials commonly used in roof framing.

BACKGROUND OF THE INVENTION

T-Squares including protractors are known and are used for measuring angles.

For instance, U.S. Pat. No. 936,157 (Phenix) describes a measuring instrument to be used as a bevel or a square having a member 1 having formed therein a protractor extending between two points of the member intermediate the length thereof, and a second member 4 pivotally attached to member 1 by a bolt 3, the connection between the two members being centrally of the protractor 2. In use, the member 4 is moved on its pivot 3, the angle of the level being assured by the protractor 2. A binding screw 9 contacts the protractor 2 in engagement with an arm 8 for binding the member 4 thereto and as the protractor is carried by the member 1, the member 4 will be held against movement (see FIG. 1). U.S. Pat. No. 1,083,376 (Robinson) describes a combination measuring instrument having two arms pivotally hinged to one another by a pivot. A protractor arc or scale engages both arms so that its center is coincident with the axis of the pivot 3, 7, and 8. A slot in the protractor arc is used to guide the two arms for ready adjustment of the angle therebetween in conjunction with two screws for clamping the arm to the protractor arc (see FIG. 1). U.S. Pat. No. 2,247,327 (Brady) describes a measuring instrument similar to that of Robinson. In the device of Brady one of the hinged arms was substituted with a level which has formed therein end slots 6 and an intermediate slot 7 having therein spirit bubble tubes for ascertaining when work is level (see FIG. 1).

U.S. Pat. No. 4,611,407 (van Gorp) describes a pivot assembly for a guide or marking tool (10) comprising a stock (12) with a reference edge (31) alignable with a desired datum (36), a blade (13) with a sighting, guiding or marking edge (16) and a semi-circular segment (18) provided with angle indicia (19). The stock (12) is pivotally connected to the blade (13) so that the angle between the reference edge (31) and the sighting edge (16) may be adjusted to a predetermined setting and the pivot axis (9) of the stock (12) relative to the blade (13) is located at the intersection between the reference edge (31) and the sighting edge (16) at all relative angular settings between the stock (12) and the blade (13). Pivoting of the stock and blade is effectuated by arcuate guide tracks on the stock (12) mating with corresponding depending flanges on the undersurface of segment (18). A slot (22) concentric with the guide tracks is provided in the segment (18), whereby lightening of the thumb wheel (24) clamps the segment (18) firmly against the upper surface (28) of the stock (12).

U.S. Pat. No. 4,736,524 (King) describes a framing T-Square and protractor wherein the head of the T-Square and the elongated rule thereof are connected by means of a ballbearing allowing the rule portion to be free-swinging with respect to the head, which is in the form of a rectangular plate having a protractor scale thereon marked in degrees and auxiliary scales marked with inches of rise per 12 inches of run for common rafters and for hip and valley rafters. A rectangular panel is hingedly attached to the plate on a hinged line normally at right angles to the elongated rule; a friction locking mechanism permits the rule to be locked at any desired angle relative to the plate and panel. The rule, plate, and panel are marked on the back with rafter tables and other data including run lengths and protractor angle settings useful in roof framing and other construction or carpentry work. A vernier scale on the front of the panel facilitates setting of angle measurements to an accuracy of one-tenth of a degree.

U.S. Pat. No. 6,954,990 (Ellis) describes a measuring device for carpenters, roofers and other tradesmen. The device is made of relatively lightweight plastic and has a variety of uses. The elongated base is rectangular in cross sectional and includes a scale for measuring distances along one side. Pivotally affixed to the base is a level which can be locked against a protractor (also affixed to the base) at any angle between zero and ninety degrees (0.degree.-90.degree.). Roof pitches, gradients and other angles can be determined or set in a simple, easy to learn manner. FIG. 1 illustrates a measuring device 10 seen in perspective fashion having base 11, level 12 and protractor 13. As shown in FIGS. 1, 2, and 7, slots 24, 24' are defined in base 11 and level 12 to accommodate protractor 13. Protractor 13 is rigidly mounted within base 11 such as by frictionally fitting therein or with conventional glues or adhesives. Level 12 is also mounted to base 11 by hinge 15. Window 16 within level 12 is preferably formed from a transparent rigid plastic material such as a clear polycarbonate or polyacrylate and is affixed to level 12 as seen in FIGS. 1, 3, and 4. Window 16 includes aperture 17 through which threaded locking member 18 is positioned. Locking member 18 passes through window aperture 17 of window 16 and slot 19 of protractor 13 whereby, effectively bolt nut 14, as seen in FIG. 2, is used to tighten threaded member 18 in place. Locking member 18 can be manually tightened to lock level 12 in any number of positions along scale 30 having line gradients 31, relative to base 11.

U.S. Pat. No. 7,188,427 (Johnson) describes a multi-task protractor apparatus having the capabilities of a rotating protractor, adjustable triangle, ruler, miniature leveler, framing square and roof angle finder is disclosed. The multi-task protractor accurately measures angles and slopes and provides two straight edges for constructing angles and triangles. The multi-task protractor has a) a ruler of a selected length, having a first edge and a second edge, a first side and a second side, a length and a width, a first connector opening, at least one second connector opening and at least one leveling vial; b) a rotatable arm having a first and a second end, a first and a second side, a first arm connector opening near the first end of the rotatable arm and a second arm connector opening and being connected to the ruler by a first connector connecting the first connector opening and the first arm connector opening for rotation about the first connector or positioning in selected fixed orientations relative to the ruler and the first connector wherein the rotatable arm includes at least one opening positioned and configured to be positioned over at least one vial when the rotatable arm is positioned over the first side of the ruler; and; c) a protractor comprising a 180 degree arc having an arc inside and an arc outside, a first and a second end, a passageway extending around the 180 degree arc between the arc inside and the arc outside and at least one set of graduations on at least one side of the protractor, the protractor being connected to the ruler and to the rotatable arm by at least one of a second connector connecting at least one of the plurality of second connector openings, and the passageway and a third connector in the second arm connector opening to enable sliding and rotationable movement of the protractor relative to the rotatable arm and to enable positioning the protractor in selected fixed positions relative to the ruler and the rotatable arm.

U.S. Pat. No. 7,278,217 (Mills) describes a trigonometric teaching aid for providing students with real life applications for the principles of trigonometry includes a transit assembly having a sight tube with cross hairs, a level and an upper protractor pivotally connected to an upper end of a vertical scale, and a base assembly including a lower protractor pivotally connected to a lower end of the scale member. By levelling the transit assembly and measuring the angles of inclinations at the protractors, student using trigonometric formulas, tables and classroom lessons can determine physical measurements of real life objects.

The conventional devices involve a T-square style part and a protractor part. However, the conventional devices appear impractical and inefficient for measuring angles and scales in roof framing due to their small size and unbalanced construction from side to side.

Accordingly, there would be a need for a simpler more robust T-square including a protractor adapted for use in construction for measuring large roofing and/or wallboard materials. Such a device would have a solid construction adapted for inscribing lines at various angles on large stock material, for example 4 ft×8 ft, commonly used in the construction industry.

The invention, was, thus, made in recognition of the need for a simpler, robust, and maintenance free T-square and protractor adapted for measuring large material used in roof framing and otherwise in the construction industry.

SUMMARY OF THE INVENTION

It is, therefore, an aspect of the present invention to address the deficiencies found within the prior art.

The present invention overcomes the aforementioned deficiencies by the nature of its design and size. One embodiment of the present invention will be a framing T-square protractor apparatus including a first rule (1) element having first and second edges (10,11), a surface (12), and a length of about from 1 to 5 ft, preferably about 3 ft, between the first and second edges (10,11); a second rule (2) element having first and second edges (20,21), a surface (22), and a length of about 2 to 7 ft, preferably about 5 ft, between the first and second edges (20,21), the second rule element (2) being pivotally connected to the first rule element (1) midway between the first and second edges (10,11) of the first rule element (1); and a semi-circular element (3) extending between the first and second edges (10,11) of the first rule element (1) to form an 180 degrees arc with 0 to 90 degrees angle indicia on each half, the semi-circular element (3) being connected to the first and second edges (10,11) of the first rule element (1) and being adapted to movably receive the second rule element (2) for sliding along the semi-circular element (3).

According to another embodiment of the invention, there is provided a kit which includes the T-square protractor apparatus of the invention and a table or chart including angles for roofing cuts converted into degree increments that can be measured on the apparatus.

BRIEF DESCRIPTION OF THE DRAWINGS

The present invention will be further understood from the following detailed description of preferred embodiments of the invention, having regard to the accompanying drawing, in which.

DETAILED DESCRIPTION OF THE INVENTION

A better understanding of the present invention and its objects and advantages will become apparent to those skilled in this art from the following detailed description, wherein there is described only the preferred embodiment of the invention, simply by way of illustration of the best mode contemplated for carrying out the invention. As will be realized, the invention is capable of modifications in various obvious respects, all without departing from the scope and spirit of the invention. Accordingly, the description should be regarded as illustrative in nature and not as restrictive.

Figure 1:
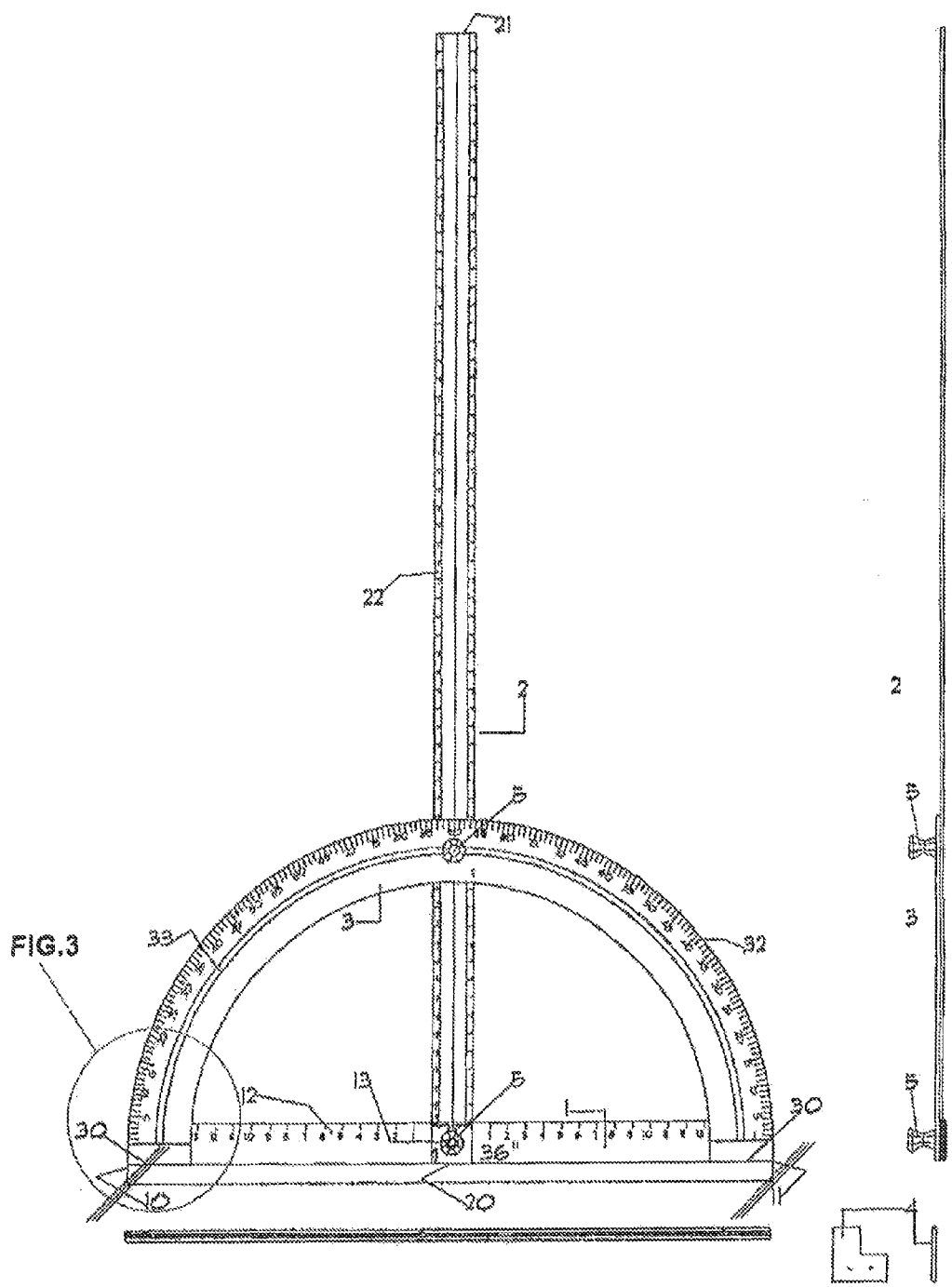
FIG. 1 is a top plan view of a T-square protractor according to an embodiment of the invention.

As embodied herein and shown in FIG. 1, a framing T-square protractor apparatus includes a first rule element (1), a second rule element (2) and a semi-circular element or protractor (3).

Figure 2:
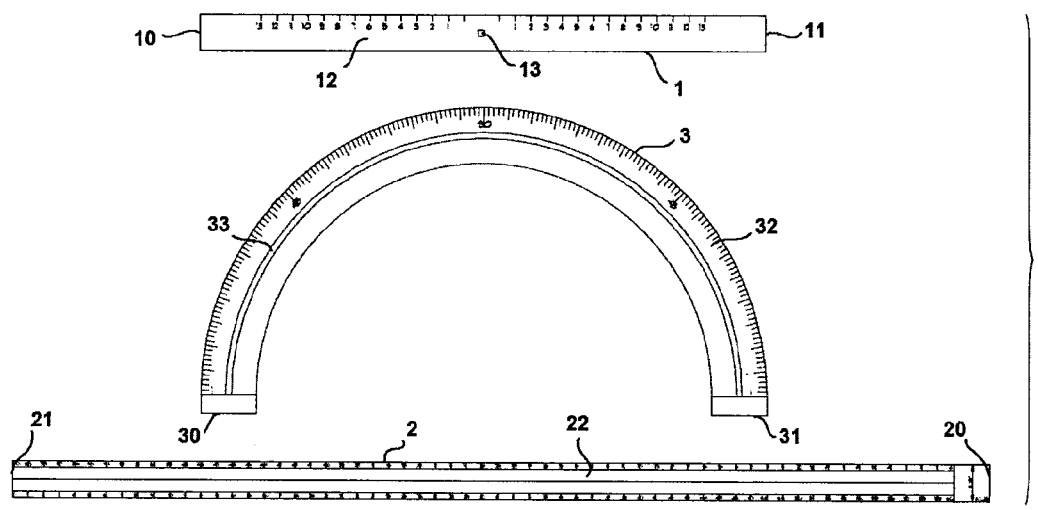
FIG. 2 is an exploded view of the elements of the T-square protractor shown in FIG. 1.

Referring to FIG. 2, a framing T-square protractor apparatus according to an embodiment of the invention includes a first rule element (1) having first and second edges (10,11) and a surface (12). The first rule element (1) can have a length of about 1 to 5 ft, preferably about 3 ft, between the first and second edges (10,11).

The second rule element (2) has first and second edges (20,21) and a surface (22). The second rule element (2) is longer than the first rule element (1) and can have a length of about 2 to 7 ft, preferably about 5 ft, between the first and second edges (20,21). The second rule element (2) intersects the first rule element (1) and can be pivotally connected to the first rule element (1) at the center (13) of the distance between the first and second edges (10,11).

As embodied herein and further shown in FIGS. 1 and 2, the semi-circular element (3) preferably extends between the first and second edges (10,11) of the first rule element (1) to form an 180 degrees arc. Angle indicia are preferably provided on the surface (32) of the semi-circular element or protractor. For example, the surface (32) of the protractor (3) can be marked with 0 to 90 degrees angle indicia on each half, and can measure ⅛ of a degree, preferably ¼ of a degree. The semi-circular element or protractor (3) can be fixedly or detachably connected to the first and second edges (10,11) of the first rule element (1). The protractor element (3) can be adapted to movably receive the second rule element (2) for sliding along the semi-circular element (3). For example, the protractor element may include a passageway such as a slit (33) for guiding and sliding the second rule element (2). This can be achieved, for example, by use of a threaded member such as a peg or protrusion (not shown) mounted on the second rule element (2) and extending through the passageway or slit (33). In combination with a nut member the threaded member can be used to restrict the movement of the second rule element (2) along the protractor (3). Rotating the nut on the threaded peg locks the second rule element (2) into a position corresponding to the desired angle measured on the protractor (3). In accordance with another aspect, the means for restricting the movement of the second rule element can comprise a carriage bolt that passes through an opening in the second rule element (2) and the slit of the protractor (3) and a screw knob.

As shown in FIG. 1, according to an aspect of the invention the second rule element (2) can be mounted on the surface (12) of the first rule element (1), such as the bottom surface of the first rule element (1) is lower than the bottom surface of the second rule element (2). This can advantageously be used when measuring angles by aligning the apparatus with the edge of the roofing drywall or concrete board siding to be inscribed for cutting.

The first and second rule elements (1,2) and the semi-circular element (3) can be made of wood, plastic, metal or a combination thereof. Preferably the material is aluminum. However, any material can be used as long as it can provide a sturdy apparatus adapted for use as described herein.

In accordance with another aspect of the invention the first and second rule elements (1,2) can include a units length measurement scale on the surface (12,22).

Figure 3:
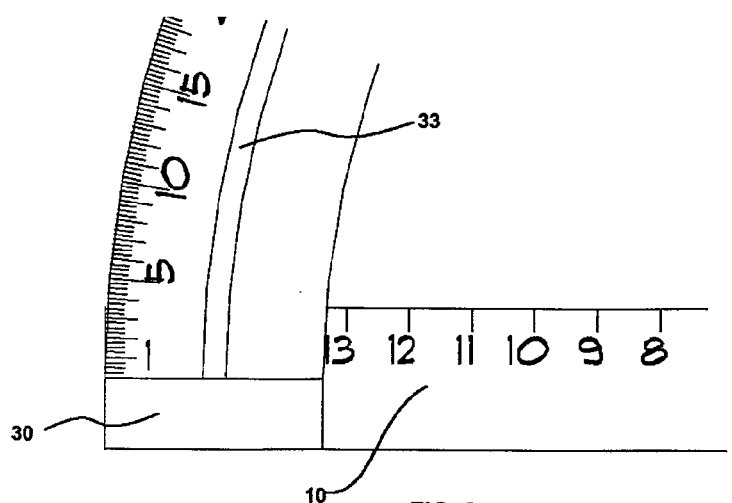
FIG. 3 is a magnified view of a portion of the T-square protractor shown in FIG. 1.

As shown in FIG. 3, the apparatus of the invention by virtue of a degree units scale provided on the semi-circular element (3) can measure ¼ of a degree, preferably ⅛ of a degree, providing, thus, an increased accuracy over 4 ft. For example, a combination roof slope of 6/12 slope and 9/12 slope creates an angle on the 6/12 side, of a difference from the long part of the angle to the short part of the angle, over the 4 ft of 28⅝ inches. In fraction form, that would be 28⅝ over 48, i.e., converted to degrees, would be 59⅛ degrees. In operation, if the T-square would be set on 59⅛ degrees and placed on a sheet of 4 ft by 8 ft plywood, placing the T-square protractor of the invention along the 8 ft edge and crossing the 4 ft edge the difference measured along the 8 ft edge would be 28⅝ inches. As such, it can be possible to readily measure this difference by using the T-square protractor of the invention and additionally by scribing along the blade of the T-square one would obtain a cutting line on the plywood material which can be used as indicia for cutting along with a circular saw or other cutting tool.

A kit, according to an aspect of the invention, includes the apparatus of the invention and a table or chart including angles for roofing cuts converted into degree increments that can be measured on the apparatus. For example, various angles in degrees can be provided as measured on the protractor corresponding to roof slopes converted into degree increments that can be set on the protractor square of the invention. Also, common level and plumb cuts of the most widely used roof slopes included in the chart can be stamped on the apparatus.

INDUSTRIAL APPLICABILITY

The invention can be used for common roof cuts with large roofing panels having a size of 4 ft×8 ft used in the construction industry. In particular, the invention is adapted for the modern construction industry's special combination roof sheathing cuts and roof designs. For example, it can be used for unequal pitch intersecting hip and valley sheathing cuts. It can also be used for common cuts for sheet siding, such as concrete boards sold in 4 ft×8 ft panels, and the drywall industry can benefit because of the more architectural design homes and commercial projects with cathedral and vaulted ceiling lines.

The embodiments of the present invention in which an exclusive property or privilege is claimed are defined as follows:

1. A framing square protractor apparatus comprising:
   a first rule element having at opposing ends first and second edges, respectively, a surface, and a length of about from 1 to 5 ft between the first and second edges of the first rule element;
   a second rule element having at opposing ends first and second edges, respectively, a surface, and a length of about 2 to 7 ft between the first and second edges of the second rule element, the first edge of the second rule element being pivotally connected to the first rule element midway between the first and second edges of the first rule element; and
   a semi-circular element attached to and extending between the first and second edges of the first rule element to form an 180 degrees arc with 0 to 90 degrees angle indicia on each half, the semi-circular element being connected to the first and second edges of the first rule element and being adapted to movably receive the second rule element for sliding along the semi-circular element.

2. The apparatus according to claim 1, wherein the second rule element is mounted on the surface of the first rule element.

3. The apparatus according to claim 1, wherein the semi-circular element comprises a passageway for slidably receiving the second rule element.

4. The apparatus according to claim 3, wherein the second rule element further comprises a member extending outwardly, which is received by the passageway to direct movement of the second rule element along the semi-circular element.

5. The apparatus according to claim 1, further comprising a means for restricting the movement of the second rule element.

6. The apparatus according to claim 4, wherein the member extending through the passageway is threaded, thereby allowing a nut member to secure the second rule element at a desired position along the semi-circular element.

7. The apparatus according to claim 1, wherein the first and second rule elements and the semi-circular element comprise wood, plastic, metal or a combination thereof.

8. The apparatus according to claim 1, wherein the surfaces of the first and second rule elements include a units length measurement scale on the surface.

9. The apparatus according to claim 1, wherein the surface of the semi-circular element includes a units degree measurement scale in ¼ degree increments.

10. The apparatus according to claim 1, wherein the surface of the semi-circular element includes a units degree measurement scale in ⅛ degree increments.

11. The apparatus according to claim 1, wherein the length of the first rule element is about 3 ft.

12. The apparatus according to claim 1, wherein the length of the second rule element is about 5 ft.

* * * * *